United States Patent [19]

Wilms

[11] 4,181,615
[45] Jan. 1, 1980

[54] FILTER APPARATUS

[76] Inventor: Hans Wilms, von Luninck Str. 16, 5750 Menden, Fed. Rep. of Germany

[21] Appl. No.: 942,095

[22] Filed: Sep. 13, 1978

[30] Foreign Application Priority Data

Sep. 16, 1977 [DE] Fed. Rep. of Germany ....... 2741659

[51] Int. Cl.² .................... B01D 25/12; B01D 25/34
[52] U.S. Cl. ................................... 210/230; 100/199
[58] Field of Search ............ 210/224, 225, 226, 227, 210/228, 229, 230, 231, 236; 100/112, 199, 206, 196, 197, 198; 417/244, 395, 390, 302; 72/453.01, 421

[56] References Cited

U.S. PATENT DOCUMENTS

| 2,843,050 | 7/1958 | Harper | 417/390 |
| 3,144,819 | 8/1964 | Riddell | 100/112 |
| 3,981,802 | 9/1976 | Schotten et al. | 210/91 |
| 4,105,560 | 8/1978 | Fismer | 210/230 |

FOREIGN PATENT DOCUMENTS 4320538  6/1964  Japan ....................... 210/224

Primary Examiner—Charles N. Hart
Assistant Examiner—David R. Sadowski
Attorney, Agent, or Firm—Allison C. Collard; Thomas M. Galgano

[57] ABSTRACT

The present invention relates to filter apparatus having a filter press charged by a diaphragm pump, a hydraulic closure and an automatic conveying device including a hydraulic plate conveyor device for the filter plates which are displaceable in suspended or upright state. The apparatus employs, instead of a plurality of electromotively driven drive mechanisms including chain drives, a central hydraulic liquid supply for the simultaneous or alternate impacting of the filter press closure, for the hydraulically driven diaphragm pump and the hydraulic plate conveyor device.

8 Claims, 6 Drawing Figures

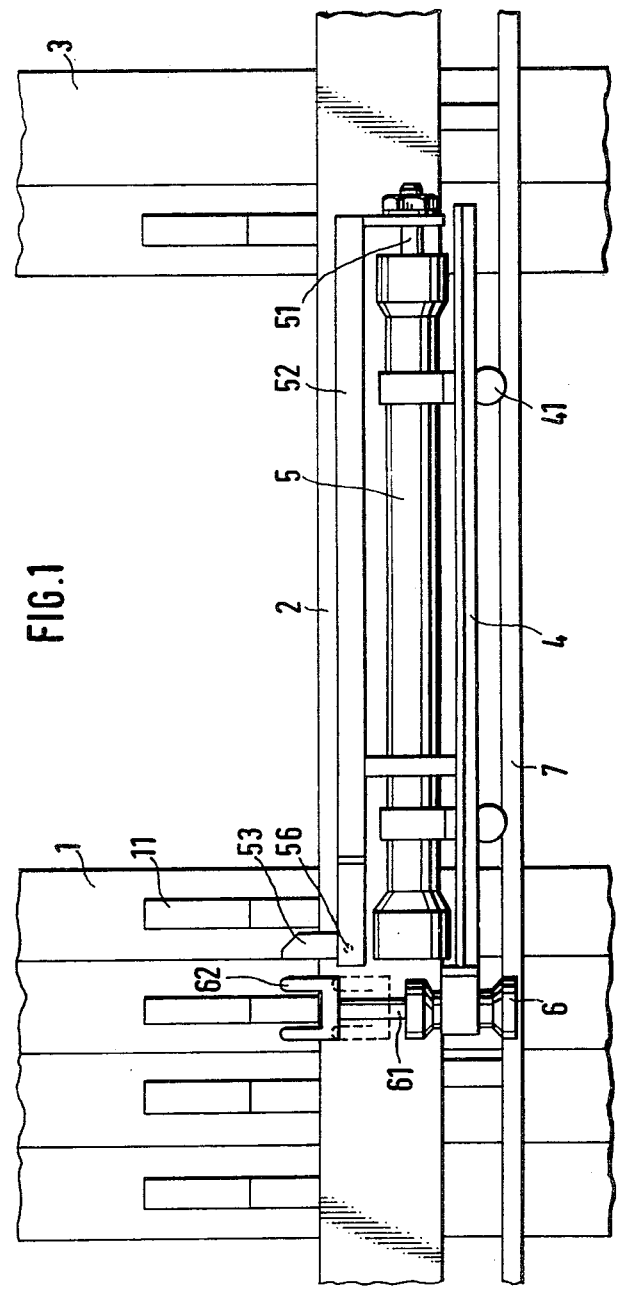

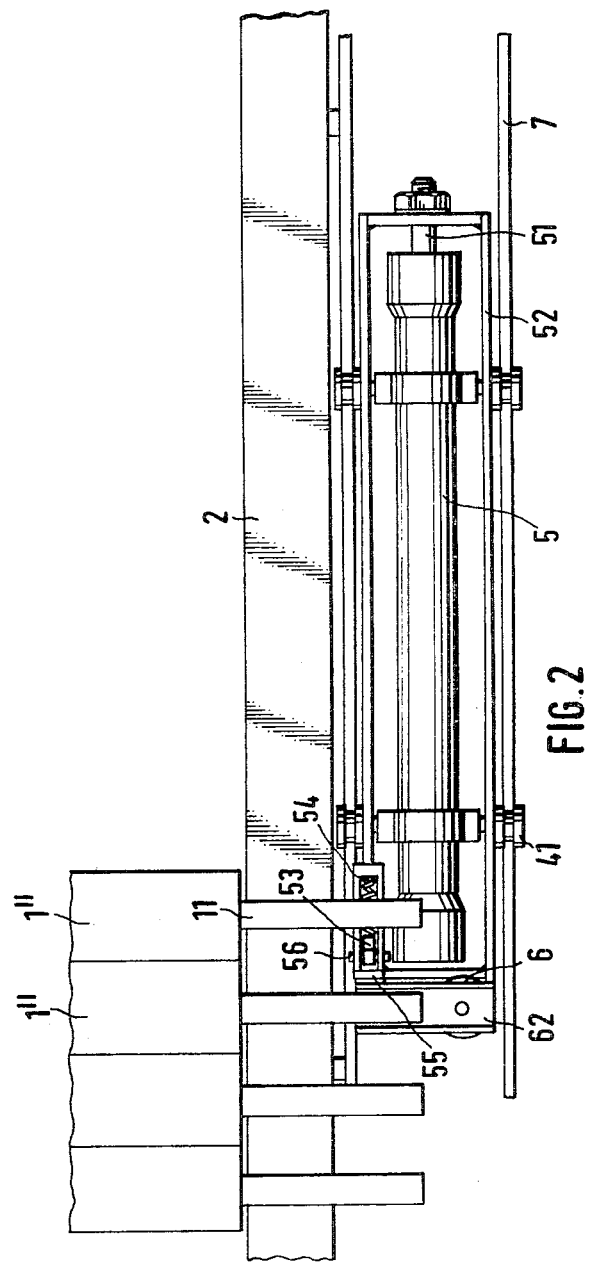

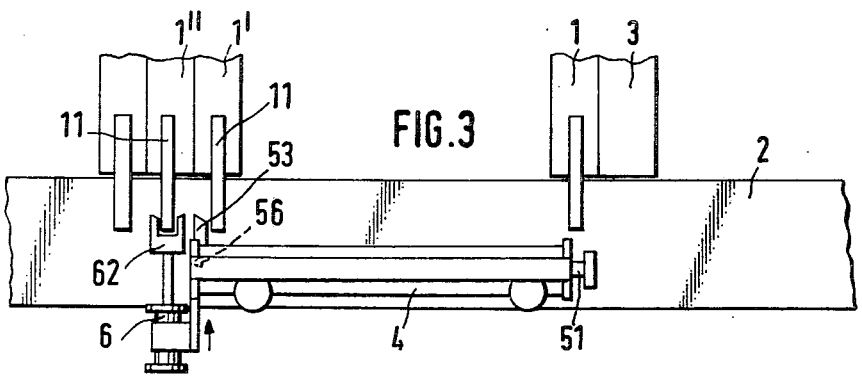
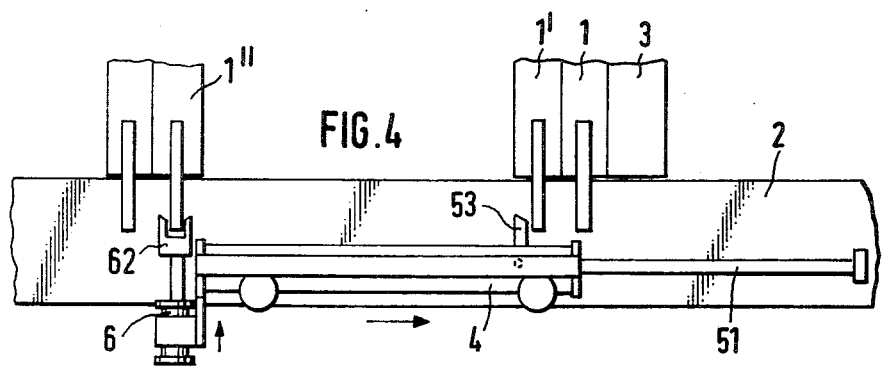
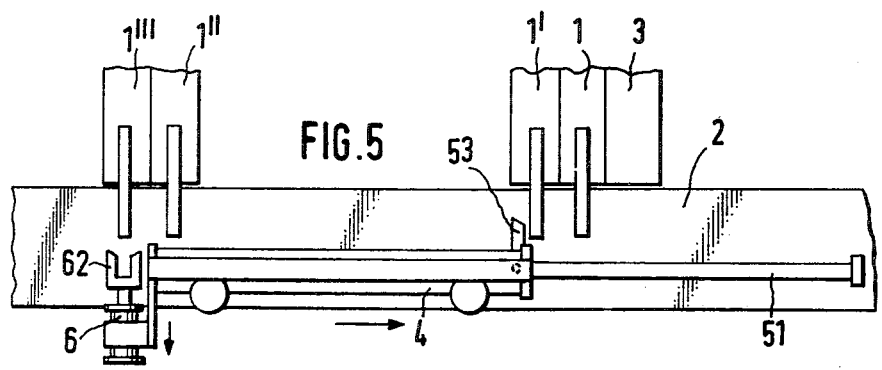
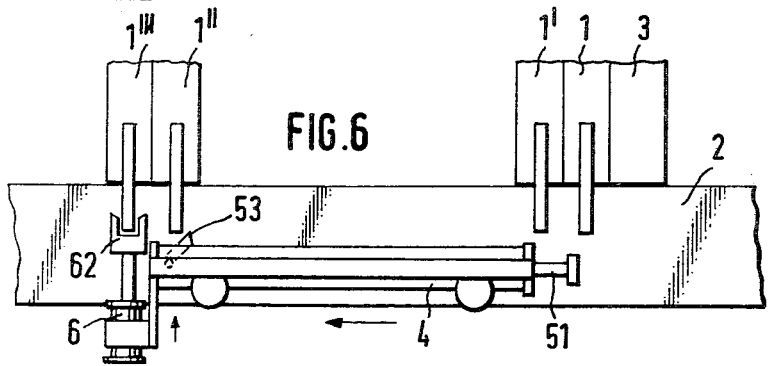

FILTER APPARATUS

The present invention relates to filter apparatus having a filter press charged by a diaphragm pump, a hydraulic closure and an automatic conveying device for the filter plates displaceable in suspended or upright state.

In known apparatus of this kind, a compartment or frame filter press for the separation of solids and liquid is generally charged via a diaphragm pump. The filter press comprised of several consecutively arranged filter plates is thus closed hydraulically. After the separation or squeezing operation, the plates have to be moved apart from one another to permit removal of the filter cake. For this purpose mechanisms have been proposed which are generally comprised of electromotively-driven engaging devices, for example, chain drives with engaging members. Known filter apparatus therefore have several juxtaposed electromotive drives for the diaphragm pump and the plate conveying device and generally have a hydraulic drive for the closure of the press which requires considerable pressures.

It is an object of the invention to provide a filter apparatus in which the expenditure for the individual devices and associated control may be simplified and wherein a functionally reliable conveyor device for the filter plates is provided.

According to the present invention there is provided filter apparatus having a filter press chargeable by a diaphragm pump and having a hydraulic closure and an automatic conveying device for displaceable filter plates suspended on rails or supported upright; characterised by the feature that a central hydraulic fluid supply is provided for the simultaneous or alternate impacting of the filter press closure, of a hydraulically operated diaphragm pump and for a hydraulic plate conveying device.

The invention also includes a plate conveying device for conveying the filter plates, in which one or two rails are located at the side of or over the displaceable filter plates and one or more trolleys or slides are displaceable on the rail or rails and trolleys or slides, on which a hydraulic cylinder is located for successive transportation of the filter plates; the piston rod of which cylinder is connected to an engaging lever which is adapted to be arranged behind the plate to be next displaced. Thus, a trolley may have a locking cylinder mounted thereon acting in vertical direction, the piston rod of which is displaceable together with a mounted fork to enclose the arm of a filter plate, whereby the locking cylinder is so spaced relative to the engaging lever or the transportation cylinder, and whereby its fork engages below the arm of the plate located behind the filter plate to be next conveyed.

As technically equivalent and hence appertaining to the invention is a plate conveying device in which the trolley or slide is displaceable by means of a pneumatic cylinder and which, if necessary, is also used for locking a pneumatic cylinder.

The advantage of the filter apparatus in accordance with the invention chiefly resides in that all necessary drives are of the same type, more especially hydraulic drives, which are favorable for attaining the necessarily high pressures and which are relatively simple to control. The structural volume of such a filter plant with reference to its secondary units may thus be considerably reduced, resulting in considerable cost economy.

The invention will be described further, by way of example, with reference to the accompanying drawings, in which:

FIG. 1 is a side elevation illustrating part of a filter press having a plate conveying device embodying the present invention;

FIG. 2 is a plan view of the apparatus of FIG. 1; and

FIGS. 3-6 are side views sequentially illustrating the principle of operation of the filter plate conveying cycle.

Reference is chiefly made to FIGS. 1 and 2 wherein filter plates 1 of a filter press are displaceable, with their lateral arms 11, in two directions along rails or beams 2. A pressure or thrust plate 3 is used for closing the filter plate assembly and is displaceable hydraulically to attain the necessary high pressures.

Thrust plate 3 is chiefly drawn-off for opening the filter plate assembly and then, under automatic control, individual filter plates 1 are successively drawn-off and displaced, by means of a conveying device, towards pressure plate 3. After emptying the individual filter plates, these are moved in turn towards one another again by means of the hydraulic closure or its pressure plate 3.

A common central hydraulic liquid supply (not shown) is provided for simultaneous or alternate impacting of the filter press closure, of a hydraulically operated diaphragm pump for charging the filter press, and for the hydraulic plate conveying.

The conveying of the plates is effected by means of a reciprocatable trolley 4 which is displaceable by means of its wheels 41 on rails 7 which are located laterally of the filter plates 1. Such a trolley and rails may be provided on each side of filter plates 1. Conveyor trolley 4 may alternatively be provided above the filter plate assembly, whereby a suspended or upright conveying of the filter plates is possible.

A conveying cylinder 5 is located on trolley 4 and acts in a horizontal direction. A horizontal frame 52 is secured to the piston rod 51 of cylinder 5 and an engaging lever 53 is secured at the rear end of this frame 52 and lever 53 is pivotal forwardly in one vertical direction against a spring 54 (see FIG. 2). During each displacement of conveying cylinder 5, lever 53 is pivoted vertically downwards against arm 11 of the next filter plate 1 to be engaged and is then automatically erected or raised due to the spring action after moving beneath arm 11 along the line of pulling. The rear part of frame 52 thus forms a stop 55. The pivotal axis of the engaging lever 53 is denoted by the numeral 56.

To prevent several adhering plates 1 being displaced at one time, a vertically acting locking cylinder 6 is mounted on trolley 5 and has a displaceable piston rod 61 which carries a fork 62 for enclosing arm 11 of a filter plate, whereby the locking cylinder 6 is so located and spaced relative to the engaging lever 53 or the conveying cylinder 5 that its fork 62 engages beneath the arm 11 of the plate located behind that filter plate which is to be conveyed next. This locking cylinder 6 during the moving of the filter plate to be conveyed therefore retains the filter plate located behind it. After each filter plate has been conveyed, the locking cylinder releases the next filter plate which is to be conveyed by retracting its fork.

The cycle of transportation and the moving of the trolley 4 is now described with reference to FIGS. 3-6:

FIG. 3 shows the state before transportation of the next filter plate 1' which is to be conveyed to a position against the filter plate 1 which has already been conveyed and is abutting against the pressure plate 3. Trolley 4 is so arranged by means of its hydraulic drive 5 that the engaging lever 53 connected to piston rod 51 engages behind arm 11 of the filter plate 1' to be conveyed next. Fork 62 on piston rod 61 of the locking cylinder 6 engages below arm 11 of the plate 1" located behind filter plate 1' to be conveyed.

By shifting the arm of piston rod 51 to which the frame 52 is secured, the filter plate 1' is displaced on the lateral rails 2 until it abuts and stops against the filter plate 1 already conveyed. This state is shown in FIG. 4.

As shown in FIG. 5 and controlled via limit switches, fork 62 of locking cylinder 6 releases arm 11 of the next filter plate 1" to be conveyed. By further extension of piston rod 51 and hence frame 52, the trolley is retracted slightly, i.e., moves to the left, since the engaging lever 53 is supported against arm 11 of stationary filter plate 1' which has been conveyed. The locking cylinder 6 with its fork 62 is thereby shifted under the control of suitable limit switches to a position below the arm 11 of the filter plate 1''', which is located behind filter plate 1' to be conveyed next.

In accordance with FIG. 6, the fork 62 is shown having been moved to a position below arm 11 of the filter plate 1''' for locking such in position. This secures trolley 4 so that the piston rod 51 of the conveying cylinder 5 with its frame may be returned. The engaging lever 53 hence strikes against arm 11 of the filter plate 1" to be next conveyed and, on account of its pivotal mounting, it pivots downwards and moves underneath the associated arm 11. After moving underneath arm 11 lever 53 is raised again on account of the spring action and hence engages behind the arm 11 of the plate 1" to be conveyed. The conveying of the plate 1" may hence begin in a manner already described.

The hydraulic drives for the conveying and locking of the filter plates may be replaced by pneumatic cylinders operating in similar manner without any change to the technical principles. The "locking-on" feature of the plate conveying device is necessary for separation of the plates especially with tacky sludge although conveying devices without such a locking device are also conceivable and considered within the scope of the present invention.

Thus, while only one embodiment of the present invention has been shown and described, it will be obvious to those persons of ordinary skill in the art that many changes and modifications may be made thereunto, without departing from the spirit and scope of the invention.

What is claimed is:

1. A filter apparatus, comprising:
   an elongated beam;
   a filter press, having a plurality of consecutively-arranged, movable filter plates displaceably mounted on said beam, for reciprocable movement between a first and second end position, in which said plates abut one another;
   a displaceable hydraulic closure disposed adjacent to said beam and opposing one end of said plurality of filter plates, said closure being reciprocably movable between a first operative position, in which said closure engages and moves said filter plates into abutting relationship in said first end position thereof, and a second operative position in which said closure serves as an abutment stop against which said plurality of filter plates may rest when displaced to said second end position thereof; and
   a plate conveying device for successively moving said filter plates from said first to said second end position thereof, said plate conveying device including at least one rail disposed along and adjacent to said filter plates, at least one trolley displaceably mounted on said rail, a feed cylinder mounted on said trolley for effecting the successive movement of said filter plates to said second end position thereof, said feed cylinder having a displaceable piston rod movable between a retracted and extended position; and a pivotable, engaging lever coupled to said piston rod for movement therewith, said lever being disposed such that, upon retraction of said piston rod, said lever engages behind the next plate to be displaced, and upon extension of said piston rod, said lever moves said next plate to said second end position thereof.

2. The apparatus according to claim 1, wherein said feed cylinder is a hydraulic feed cylinder.

3. The apparatus according to claim 1, wherein said feed cylinder is a pneumatic feed cylinder.

4. The filter press according to claim 1, wherein said filter plates each have an arm attached thereto, wherein said plate conveying device includes a horizontally disposed frame secured to said piston rod and wherein said engaging lever is pivotably mounted on said frame for vertical pivotable movement and for engagement with said arms of said plates, said lever having a spring attached thereto which urges said lever to assume a substantially vertical upright disposition so that, upon each displacement of said piston rod of said cylinder said lever is pivoted vertically downwardly upon engagement with the arm of the filter plate to be displaced next and which after passing underneath said arm is automatically raised upright due to the action of said spring.

5. The filter press according to claim 1, additionally including limit switches for controlling the extension and retraction of said piston rod.

6. The filter press according to claim 1, wherein said filter plates each have an arm attached thereto and wherein said plate conveying device includes a locking cylinder mounted on said trolley which has a vertically displaceable piston rod which carries a fork member for enclosing an arm of a filter plate, said locking cylinder being positioned on said trolley relative to said engaging lever such that its fork member engages the arm of the plate located adjacent to the plate to be conveyed next.

7. The filter press according to claim 6 wherein said locking cylinder is a pneumatic cylinder.

8. The filter apparatus according to claim 6, wherein after each successive displacement of a filter plate from said first end position to said second end position thereof, said locking cylinder is adapted to release the next filter plate to be conveyed by retracting its fork member and wherein said trolley is displaceable under the next plate by extension of said piston rod of said feed cylinder which is supported against the preceding plate displaced by said engaging lever, so as to position said fork member under the plate located behind the next plate to be conveyed.

* * * * *